United States Patent [19]

Mefferd et al.

[11] Patent Number: 4,734,915
[45] Date of Patent: Mar. 29, 1988

[54] CONDUCTION COOLED LASER BORE STRUCTURES FORMED FROM GRAPHITE AND OTHER MATERIALS

[75] Inventors: Wayne S. Mefferd, Los Altos Hills; Joseph L. Dallarosa, Los Altos, both of Calif.

[73] Assignee: Coherent, Inc., Palo Alto, Calif.

[21] Appl. No.: 716,111

[22] Filed: Mar. 26, 1985

[51] Int. Cl.⁴ .............................................. H01S 3/03
[52] U.S. Cl. ........................................ 372/61; 372/62; 372/65
[58] Field of Search .................... 372/61, 34–36, 372/62, 65; 445/28

[56] References Cited

U.S. PATENT DOCUMENTS

| | | | |
|---|---|---|---|
| 3,594,661 | 7/1971 | Roulot | 372/62 |
| 3,619,810 | 11/1971 | Mefferd | 372/62 |
| 4,001,720 | 1/1977 | Carbonetta, Jr. | 372/103 |
| 4,378,600 | 3/1983 | Hobart | 372/62 |
| 4,380,077 | 4/1983 | McMahan | 378/61 |
| 4,385,390 | 5/1983 | McMahan | 378/61 |
| 4,553,241 | 11/1985 | Chaffee | 372/62 |

FOREIGN PATENT DOCUMENTS

0163168 12/1985 European Pat. Off. .............. 378/61

Primary Examiner—Léon Scott, Jr.
Attorney, Agent, or Firm—Limbach, Limbach & Sutton

[57] ABSTRACT

The subject invention is related to a new and improved bore assembly for use with a gaseous ion laser. Each bore assembly is mountable to a heat conducting member located within the tube. The heat conducting member is provided with a central opening and is connected at the periphery thereof to the inner surface of the tube. The bore assembly of the subject invention includes a discharge confining element having a central channel and formed from a sputter-resistant material such as graphite. An outer support member is provided which is disposed about at least a portion of the discharge confining element and is brazed to the heat conducting member in a manner to mechanically constrain the discharge confining element. During assembly, the opening of the channels of the discharge confining elements are coaxially aligned. During operation of the laser, the mechanically constrained discharge confining element will be heated and expand radially into the outer support member until thermal equilibrium is achieved thereby defining a thermally conductive pathway for cooling the laser.

61 Claims, 13 Drawing Figures

CONDUCTION COOLED LASER BORE STRUCTURES FORMED FROM GRAPHITE AND OTHER MATERIALS

TECHNICAL FIELD

The subject invention relates to a new and improved bore assembly for a conduction cooled gaseous ion laser. The unique bore assembly of the subject invention uses a mechanically constrained design to establish a thermally conducting path for cooling. This permits the material, which forms the discharge confining element of the bore, to be selected without regard to the ability of that material to be brazed. In particular, this approach makes practical the use of graphite (which is difficult to braze) as a bore material in a conduction cooled laser. In addition, the selection of other bore materials can be based on factors other than brazing, such as sputter resistance, permitting greater flexibility in the design of a laser tube.

BACKGROUND OF THE INVENTION

The subject invention is related to improvements in gaseous ion lasers. It is particularly suited for use in a conduction-cooled laser of the type disclosed in U.S. Pat. Nos. 4,378,600 and 4,376,328, both assigned to the same assignee as the subject invention and incorporated herein by reference.

The type of gaseous ion laser disclosed in the latter patents includes a relatively thin-walled, electrically insulating outer envelope, formed from a ceramic material, such as alumina. A means is provided for exciting the gas within the tube to create a discharge within a central bore and for conducting heat away from the bore.

In the structure shown in the above cited patents, the means for confining the discharge consists of a plurality of sputter-resistant, coaxially aligned tungsten discs. Each tungsten disc is brazed to a heat conductive copper cup which is, in turn, brazed to the inner wall of the ceramic envelope. In operation, heat from the discharge is transferred by conduction from the discs through the copper cups and through the walls of the ceramic tube to cooling water flowing in a jacket around the ceramic tube.

In the above cited patents, tungsten is utilized for the bore material because it can be brazed to the copper cups, and because it is relatively sputter resistant. The sputter resistance of the bore is important in determining the power output and lifetime of the laser.

In order to produce a commercially viable product, the laser must be capable of operating in the field for at least one thousand hours. A primary limiting factor to operative lifetime is the slow but continuous erosion of the bore defining elements. In use, the bore material is subjected to heat and continuous bombardment by ions, which are accelerated through the wall sheath potential and strike the bore wall. This sputtering process erodes the bore wall and increases the bore diameter until it no longer provides the containment necessary to the lasing process. Accordingly, by selecting materials having high sputter resistance for the bore, lifetime can be increased.

The power output of a laser is intimately related to the lifetime and the sputter resistance of the bore. More particularly, for any given noble gas ion laser structure, if the current and thus the power output are increased, the erosion rate will increase dramatically. Thus, an increase in power is typically accompanied by a corresponding decrease in lifetime such that a more sputter-resistant bore material would be advantageous.

One of the major factors which has prevented the construction of bores with improved sputter resistance is the requirement that the bore material be capable of being readily brazed to the heat conductive cup member. There are presently materials available which are more sputter resistant than tungsten, but are not easily brazed. Some materials are too brittle to withstand the thermally induced stresses associated with a braze joint. Other bore materials are available that could be brazed, however, these materials require braze temperatures or part geometries not compatible with the fabrication of the remainder of the laser tube. It would be highly desirable to develop a bore design which permitted selection of the bore material based on its sputter resistance, independent of its ability to be brazed to the copper cups.

Accordingly, it is an object of the subject invention to provide a new improved conduction cooled graphite bore assembly for an ion laser.

It is a further object of the subject invention to provide a new and improved bore assembly which permits the use of a wide variety of materials for the discharge confining element.

It is another object of the subject invention to provide a new and improved bore assembly which permits the selection of the material forming the discharge confining element without regard to its brazing characteristics.

It is a further object of the subject invention to provide a new and improved bore assembly which permits the discharge confining element to be selected from a group of materials which are highly sputter-resistant.

It is still another object of the subject invention to provide a new and improved bore assembly which facilitates the testing of new bore materials.

It is still a further object of the subject invention to provide a new and improved bore assembly that permits the design of longer lasting lasers.

It is still another object of the subject invention to provide a new and improved bore assembly which will allow a laser to be designed having a greater power output.

It is still a further object of the subject invention to provide a new and improved conduction cooled ion laser with simplified internal parts.

SUMMARY OF THE INVENTION

In accordance with these and other objects, the subject invention provides for a new and improved bore assembly adapted for use in a gaseous ion laser. The gaseous ion laser may be of the type having a thin-walled, cylindrical tube formed from an electrically insulating material. The tube is provided with a plurality of heat conducting members, each having a central opening. The periphery of each heat conducting member is attached to the inner surface of the cylindrical tube to provide a thermally conductive path.

The improved bore assembly is defined by a discharge confining element or insert having a central channel formed therein. An outer support member or sleeve is provided which is disposed about at least a portion of the discharge confining element. The outer support member is connected to the heat conducting member in a manner such that the discharge confining element is mechanically constrained.

During assembly, the bore assemblies are mounted on a mandrel in a manner described in U.S. Pat. No. 4,376,328. During fabrication, the mandrel is tensioned to bring the central channels of each of the inserts into coaxial alignment. At this time, the sleeve can be brazed to the associated heat conducting member in a manner to mechanically constrain the insert. The heat conducting members can be brazed to the wall of the laser tube in the same step.

As discussed in greater detail below, there are a number of embodiments for mechanically constraining the discharge confining element. In each of the embodiments, a close fitting arrangement is established between the discharge confining element and the outer sleeve to define a pathway for conductively transferring heat generated in the discharge to the walls of the tube. In the subject application, the term mechanically constrained is intended to define a geometry where the thermal pathway is enhanced during the operation of the laser. Specifically, during operation, heat generated by the discharge along the bore axis flows radially away from this axis, and thus the bore insert is heated to a higher temperature than the outer sleeve, causing it to expand radially into the sleeve. In a mechanically constrained geometry, this expansion creates a more intimate contact between the members such that they stay together and define a good thermal pathway as they are heat cycled during operation of the laser.

The thermal contact area between the bore element and the outer sleeve can be viewed as being made up of microscopic peaks and valleys which locally protrude into one another. The radial differential expansion forces more peaks into more indentations across the boundary surface so that the surface area in intimate contact increases with the differential temperature rise. Thus, it is only necessary to insure an initial close fit at room temperature since the heat generated during operation will improve thermal transfer. The closeness of fit required is determined by the rate of differential expansion between the insert and sleeve materials, the heat input per bore assembly which must be dissipated, and the maximum acceptable temperature of operation of the insert. The fit should be configured to mechanically constrain the insert in the sleeve, and thus force an increase in thermal contact area with differential expansion.

The use of radial expansion to improve the thermal pathway for conduction cooling of a laser bore has been utilized in the prior art. For example, U.S. Pat. No. 3,501,714, to Myers, discloses disc-shaped heat conducting members that are mounted into a thin-walled outer ceramic tube. In one embodiment, the discs are provided with undercuts near their periphery to produce a spring-like action, allowing slightly oversize discs to be forced into the ceramic tube. In another embodiment, solid discs are fit loosely into the tube. During operation of the laser, these discs expand radially into improved thermal contact with the ceramic wall. The optical straightness required of the bore is obtained by tightly tolerancing the roundness and straightness of the inside diameter of the ceramic tube, the outside diameters of the discs, and the concentricity of the apertures in the discs. In addition, the surface finishes of these radially contacting parts is tightly specified. While these tolerances could be achieved, lasers were never built in the lengths of present commercial water cooled ion lasers.

The subject invention overcomes the disadvantages of the Myers approach by segmenting the containment structure to define relatively small parts and simple shapes. As can be appreciated, it is much easier to provide toleranced parts of short segments, rather than long tube lengths. The subject construction has the additional advantage of providing a ready means for coaxially aligning the bore members. More specifically, the bore assemblies can be mounted on a mandrel which is tensioned to bring all the channels of the bores into coaxial alignment prior to the step of permanently attaching the bore assemblies to the heat conducting members.

In the Myers patent, cited above, there is a discussion of the desirability of choosing a material for the heat conducting member (Myer's discs) which has a coefficient of thermal expansion less than that of the outer ceramic wall. Ceramics generally have low expansion coefficients, are strong in compression but fail in tension, and so could be readily broken by the expansion of a contained metal disc (except for a few low expansion metals). In contrast, in the subject invention, the outer sleeve can be a metal while the bore-defining insert can be formed from a refractory material of low expansion coefficient. By putting the brittle bore-defining material on the inside, and the ductile, high expansion material on the outside (the sleeve), the present invention overcomes this latter limitation in Myers.

Various geometries and embodiments for carrying out the subject invention are set forth in detail below. It should be understood, however, that by using close fitting mechanical confinement, the subject invention permits the material, which forms the discharge confining element to be selected without regard to its brazing characteristics.

In the preferred embodiment, graphite is used for the bore-defining element. In the prior art, where electrically conducting, long bore elements, of thicknesses comparable to or greater than the bore diameter were used, there is observed an accelerated erosion on the anode facing end of the element relative to the cathode facing end. For example, a tungsten bore element of 5 mm thickness and having an originally straight bore hole of 2.8 mm diameter was operated in a krypton laser at 650 Amps/cm$^2$ current density for 400 hours. In this element, a conically shaped hole, opening towards the anode was produced, from which approximately 50 mm$^3$ of tungsten was removed by sputtering. This erosion rate contrasts to about 1/10 as much volume of tungsten removed from a thin, 0.5 mm thick bore element (as found in the Hobart device) in over twice as much operating time at a similar current density in another krypton laser.

This accelerated erosion rate is due to the larger difference between the plasma potential along the central bore, and the potential at the anode end of the bore-defining element, as explained in the prior art (see, for instance, "Construction of Long-Life Argon Lasers" by K. G. Hernqvist and J. R. Fendley, Jr., IEEE Journal of Quantum Electronics, Vol. QE-3, Feb. '67, p. 66–72, especially FIG. 4). This effect of rapid erosion of long, electrically conducting bore elements is an important effect which limited the practical application of earlier ion laser bore designs, notably those shown in U.S. Pat. No. 3,531,734 to E. I. Gordon and E. F. Labuda. The sputtered material in such tube designs moves to other places in the tube and can cause electrical short circuits between segments. A shorted condition can cause a tube failure (breaking of the ceramic wall) due to nonuniform discharge heat input to the shorted section.

The sputter resistance of graphite is so great, however, that even long bore elements of this material show no significant erosion (see "Controlled Sputtering of Metals by Low-Energy Hg Ions" G. K. Wehner, *Physical Review* 102, p. 690, 1956 at FIG. 7, and see also, N. Laegreid and G. K. Wehner, "Sputtering Yields of Metals for Art and Ne+ Ion with Energies from 50 to 600 eV", J. Appl. Phys. 32 (March '61), pp. 365-369, R. V. Stuart and G. K. Wehner, "Sputtering Yields at Very Low Bombarding Ion Energies", J. Appl. Phys. 33 (July '62) pp. 2345-2352 and references therein). As discussed below, by using long graphite bore-defining elements, it is possible to simplify the internal tube parts. Specifically in the Hobart device, cylindrical ring gas barriers are desirable to isolate the discharge region (where the gas is hot and ionized) from the region in the tube with the gas return apertures (where cool, electrically neutral gas is desirable for efficient gas return). In the present invention, long bore elements, with a small gap between them function to provide a heat sink for the hot plasma, thereby preventing the plasma from heating the cooler gas located radially outside the assembly. The long bore element also prevents ions from reaching the region of the gas return path holes by forcing recombination of the ions on the closely spaced surfaces of adjacent bore assemblies. These effects result in the gas pumping, from one end of the tube to the other, being controlled. Thus, the long, highly sputter-resistant bore assemblies function in a manner equivalent to the gas barriers in the Hobart device. In fact, it is possible to operate a tube without separate cylindrical gas barriers.

This simplification has practical significance in that the additional surface area on the copper cup, made available by the elimination of ring gas barriers, may be used to increase the conductance of the gas return path (by adding apertures), or provide the same gas return conductance in a smaller outside diameter tube. An ion laser typically uses an axial magnetic field. Thus, if outside diameter of the tube is reduced, the magnet may be made smaller, lighter and at lower cost.

One additional benefit of the subject invention is that it permits the rapid evaluation of different materials for the discharge confining elements. Much work has been done testing various materials for sputter resistance, particularly by G. K. Wehner, mentioned above. However, his results for sputtering of materials is much more extensive for sputtering by argon ions, than for neon, krypton, or xenon ions, and there are useful ion laser transitions in all of these gases. Sputter rates depend very much on both the ion and material, and each possible pair must be measured individually. Also, this testing has been very time-consuming, since the evaluation of each new material in a laser requires time and expense to optimize the brazing techniques and other parameters necessary to experiment with the new material. Recently, many new materials have been developed which have not been fully tested. For example, high density, high purity aluminum nitride with properties close to theoretical values first became available from Heraeus GmbH (Hanau, West Germany) in 1983. Many old materials were tested for sputter resistance at ion-impact dosage levels of one percent or less of that which they would receive as a bore material over the life of a typical ion laser. Further testing is desirable for this more severe application. The subject invention provides a ready means for evaluating such new materials or insufficiently tested old materials for their suitability as bore elements. As can be appreciated, the untested material need merely be formed as the inner discharge confining element of the bore assembly of the subject invention, since there is no need to braze the material to the heat conductive element.

Further objects and advantages of the subject invention will become apparent from the following detailed description, taken in conjunction with the drawings in which:

BRIEF DESCRIPTION OF THE PREFERRED EMBODIMENTS

Figure 1:
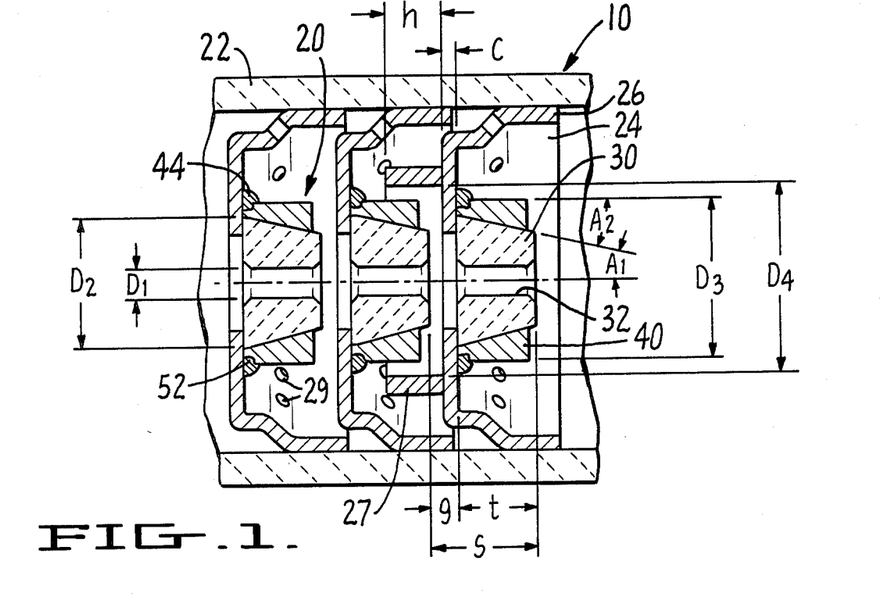
FIG. 1 is a cross sectional view of a portion of an ion laser tube illustrating the new and improved bore assembly of the subject invention.
Figure 2:
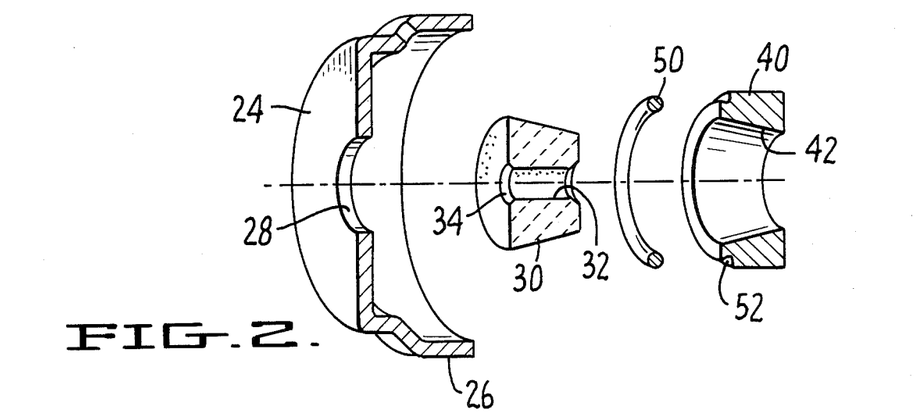
FIG. 2 is an exploded, perspective view with parts cut away, of the elements of the new and improved bore assembly of the subject invention.
Figure 12:
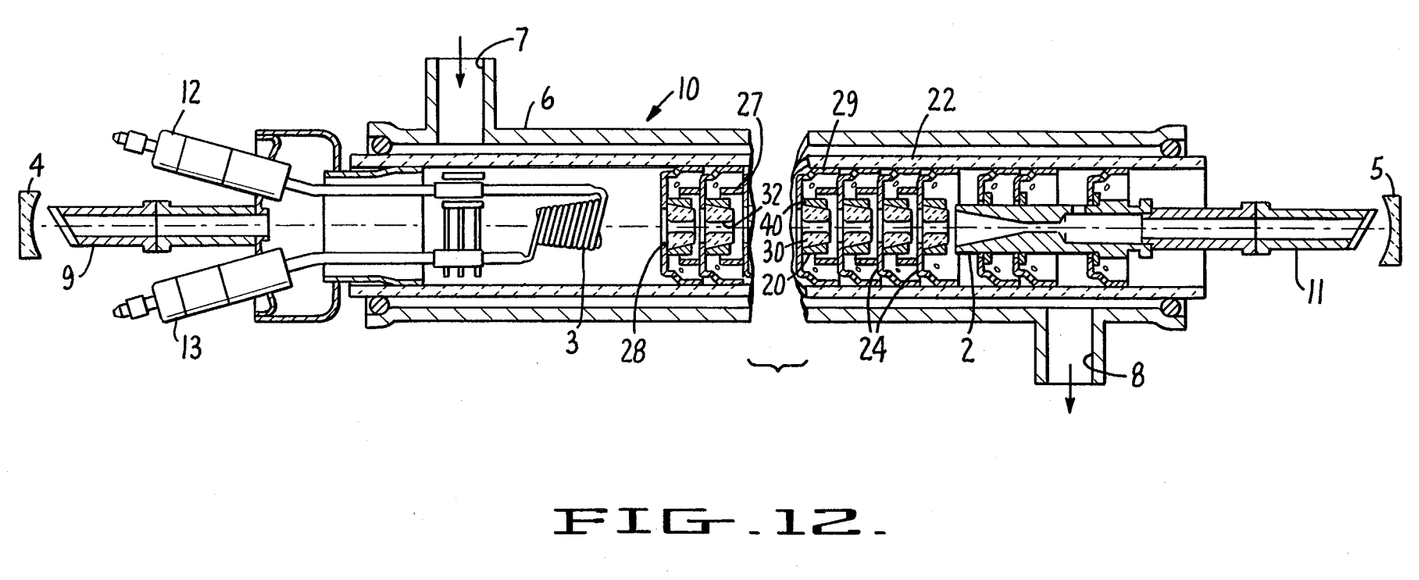
FIG. 12 is a cross sectional view of a conduction cooled ion laser made in accordance with the subject invention.

Referring to FIGS. 1, 2 and 12, there is illustrated the elements for constructing the new and improved bore assembly 20 of the subject invention. The bore assembly 20 is particularly suited for use in a gas laser and preferably a gaseous ion laser 10 of the type disclosed in U. S. Pat. Nos. 4,378,600 and 4,376,328. The construction of such a gaseous ion laser is set forth in detail in the latter patents, which are incorporated by reference, and will not be restated herein. Briefly, the laser 10 includes a relatively thin walled ceramic envelope 22, which is preferably formed from alumina. The opposed ends of the tube are provided with an anode 2 and cathode 3 for inducing the electrical discharge. Mirrors 4 and 5 are provided to define the optical cavity of the laser 10. A water jacket 6 surrounds the discharge tube. Water flowing into the jacket at inlet 7 absorbs heat conducted out of the tube and passes through outlet 8. Window assemblies 9 and 11 are also shown. The cathode assembly 3 includes two lead connectors 12 and 13 which connect with a power supply. The anode connection is not shown in FIG. 12.

In the central portion of the tube, as illustrated in greater detail in FIG. 1, a means is provided for confining the gaseous discharge and for conducting heat away from the central bore to the outer surface of the tube. The means for conducting heat is defined by a plurality of heat conducting members 24 which are generally cup-shaped in configuration. Members 24 are preferably formed from copper since it is highly heat conductive, relatively malleable and may be brazed. Each member 24 is provided with a rim section 26 which is brazed to the inner surface of the ceramic tube 22.

The assembly of the heat conducting members 24 within the ceramic tube is set forth in great detail in the above cited U.S. patents. Brazing can be accomplished through a variety of well known methods including active braze techniques and metallizing techniques. For the purposes of the subject invention, it is important to understand that a thermally conductive path is defined between the heat conductive member 24 and the outer envelope. Thus, heat from the discharge may be conducted along the members to the surface of the envelope where it may be dissipated. Heat dissipation from the ceramic envelope can be achieved by air cooling or through the use of a water cooling jacket.

Each member 24 is provided with a central opening 28. Members 24 are mounted in a manner such that the openings 28 are generally aligned. Members 24 are further provided with a plurality of gas return holes 29. Gas return holes are provided to allow the recirculation of gases during operation of the laser within the tube wall. As discussed in detail in the Hobart patent, it may also be desirable to provide a cylindrical ring gas barrier to enhance this recirculation. One ring gas barrier 27 is shown connected to the heat conducting member at the far right of FIG. 1.

As is well known in the art, a gas return path can also be provided externally of the ceramic tube. The subject invention is intended to cover either of these latter configurations.

As stated above, the means for confining the discharge is defined by the new and improved bore assembly 20 of the subject invention. The bore assembly 20 of the subject invention comprises a discharge confining element or insert 30 formed from a highly sputter-resistant material. This material can be selected without regard to its brazing characteristics. The discharge confining element is formed with a central channel 32. The opposed ends 34 of channel 32 may be flared outwardly to reduce the initial effects of sputtering.

Figure 3:
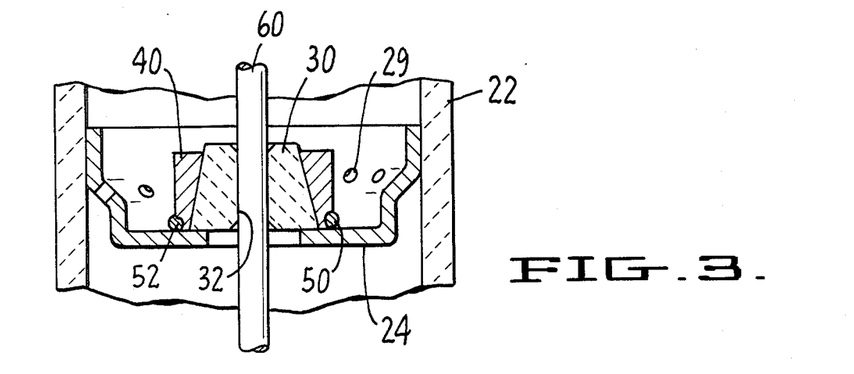
FIG. 3 is a cross sectional view of a laser tube bore illustrating a step in the assembly method of the subject invention for constructing an improved laser bore.

In the first embodiment of the subject invention, illustrated in FIGS. 1-3, the outer surface of the discharge confining element is provided with a tapered configuration. Preferably, the outer surface is smooth, with the segment defining a frusto-conical shape. The direction of taper is defined such that the diameter of the outer surface of element 30 becomes gradually smaller at points more distant from the conductive member 24 to which the element is associated.

In accordance with the subject invention, the bore assembly also includes an outer support member or sleeve 40 which is intended to be disposed about at least a portion of the discharge confining element 30. The outer support member 40 is of a material chosen to be suitable for brazing to the heat conducting member. The material of the outer support member need not be highly sputter resistant but it should be a good thermal conductor. In the absence of other requirements, it is preferable to form the outer support member 40 from the same material as the heat conducting member 24 to which it will be brazed, thereby eliminating any differences in coefficients of expansion between these elements. As discussed below, the outer support member cooperates with the heat conducting member 24 to mechanically constrain the discharge confining element.

In the illustrated embodiment, the outer support member 40 is generally cylindrical in configuration. The inner surface 42 of the support member 40 is provided with a tapered configuration which is complementary to the tapered configuration of the outer surface of the discharge confining element 30. As discussed below, the complementary configurations are designed to facilitate good thermal contact and a strong mechanical fit between the members. The remaining element shown in FIG. 2 is a braze ring 50 whose function will be discussed with reference to the assembly of the subject invention. Braze ring 50 may be formed from a material such as Nicusil-3.

Turning to FIG. 3, a step in the method of assembly of the subject invention is illustrated. The method of assembly of similar tubes is set forth in U.S. Pat. No. 4,376,328 cited above, and will not be discussed in detail except where the assembly methods are different.

During assembly of the tube, a mandrel 60 is first passed through the center of the envelope. A conductive member 24 is then inserted, with the aperture 28 centered about the mandrel. During the initial assembly steps, the tube is oriented horizontally, as shown in FIG. 12. As described in the above cited patents, the rim 26 of the cup is expanded and forced into contact with the walls of the tube. A braze ring (not shown) made of Ticusil, is placed between the cup rim and the inner wall of the envelope. In the alternative, where the cups and inner wall of the ceramic are precision machined, the cups may be allowed to expand into contact with the ceramic during the braze step. In the latter case, it may be preferable to use a metalizing step prior to the braze step.

In accordance with the method of the subject invention, a discharge confining element 30, braze ring 50 and outer support member 40 are then slid onto the mandrel and inserted into the envelope. As discussed below, in the preferred embodiment, bore assembly 20, consisting of outer support member 40 and the discharge confining element 30 are pre-assembled prior to its being mounted on the mandrel. As best seen in FIG. 2, outer support member 40 may be provided with a circumferential groove 52 to help locate braze ring 50 during assembly. The steps of inserting and expanding the heat conducting element 24 and the mounting of bore assembly elements are repeated successively until the full laser bore is defined. Where the cups and the inner surface of the tube have been precision machined, the cups may be stacked outside the tube, separated by nonconducting spacers, and then inserted within the tube. The number of elements utilized and spacing therebetween is dependent on the particular design, length and power output of the laser being constructed. FIG. 3 illustrates only a single cup and bore assembly for clarity. However, it should be understood that multiple assemblies will be present in all lasers.

After all the elements have been mounted within the tube, the laser tube is rotated to a vertical position as illustrated in FIG. 3. Mandrel 60 is then tensioned bringing the channels 32 of each discharge confining element into coaxial alignment to define the laser's bore. The entire tube is placed in an oven and heated, with the braze cycle being dictated by the braze material used. Suitable time, temperature and gas conditions for the oven can generally be obtained from the braze material manufacturer. Where Ticusil is used to braze the cups to the inner wall of the tube, a vacuum environment is used and a brazing temperature of between 830° and 850° C. is preferred. Further information may be obtained from WESGO, the manufacturer of Ticusil. The heating functions to melt the braze ring 50 providing a braze joint 44 between the periphery of the support member 40 and the associated heat conducting member 24. The attachment of the outer support member to the heat conducting member at 44 results in the mechanical capture of the discharge confining element. During the same heating step, the heat conducting member 24 may also be brazed to the inner surface of the tube 22. The resulting assembly is illustrated in FIG. 1. Preferably the outer sleeve 40 is formed from copper which can be readily brazed to the heat conducting member and form a pathway with good thermal conductivity.

In the preferred embodiment, the discharge confining element 30 is formed from graphite. As discussed above, graphite is a material with superior sputter resistance but is not particularly suitable for brazing. As can be appreciated, the subject invention permits the construction of a conduction cooled ion laser with graphite segments functioning to confine the discharge.

The mating frusto-conical shapes of the copper sleeve and insert are intended to give an intimate, close fit of the conical surfaces without the requirement of tightly tolerancing the part dimensions. This is accomplished in the pre-assembly of the sleeve 40 to bore element 30 to define bore assembly 20. Initially, the copper sleeve is annealed to make it ductile. The copper sleeves are annealed in a hydrogen atmosphere furnace for 20 minutes at 960° C. In the preferred embodiment the sleeve is then pressed onto the graphite bore 30 until the surfaces, which will face the heat conducting member, are flush.

The compressive strength of the graphite insert exceeds the tensile strength of the annealed copper, so that the sleeve diameter enlarges in the pressing step. For example, an insert of 0.30" thickness along its axis (and a cone half-angle of 2°) was inserted (without pressing) halfway within a sleeve having an original outside diameter of 0.500 inches ($D_3$ in FIG. 1). When pressed flush into the sleeve, the outside diameter of the sleeve was enlarged to 0.510". Thus, initial part tolerances of a few mils before pressing are accommodated and result in a mating-surface contact as good as the surface finish on the parts (about 32 microinches rms) after pressing. It is desirable to match the cone angles of the mating parts to within the limits accommodated by the stretching of the copper. Cone angles within this tolerance can be easily achieved by cutting both the sleeves and inserts on the same lathe set-up, or by using matched forming tools to cut complementary cones.

Since the copper sleeve has a greater thermal coefficient of expansion than that of graphite, a superior mechanical and thermal contact can be achieved by another approach during assembly. Referring to FIG. 3, during the brazing step, the outer support member will expand an amount greater than the discharge confining element. If, during the pressing step, the copper sleeve was not pushed down such that it is flush with the face of the graphite element, the sleeve will now drop downwardly, closer to the heat conducting member 24. Upon cooling, the sleeve will contract, compressing into the graphite element providing extremely good thermal contact. In addition, this shrinkage improves the containment of the discharge confining element.

The subject invention may also be implemented where the relative thermal coefficients of expansion of the elements are reversed. In this case, upon cooling during the braze cycle, some slight separation might develop between the outer support member and the discharge confining element. As discussed above, in operation of the laser, heat will be generated in the central bore hole and will cause the discharge confining element to expand radially and reestablish tight contact with the outer support member.

In some situations, it may be desirable to improve the containment and thermal pathway of the bore assemblies by brazing the bore insert to sleeve. In the past, it has been quite difficult, if not impossible, to braze graphite to metals. However, in recent years, new brazes, such as active metal brazes, have been developed, which make these brazes possible. (See *Handbook of Materials and Techniques for Vaccum Devices*, by Kohl, Reinholt Publishing Co., N.Y., 1967 at p. 382.) One such active metal braze is Ticusil.

These active metal brazes, unlike many conventional braze materials, do not 37 wet" surfaces and flow into voids very well, and therefore require that an intimate contact be established between the parts to be joined and the intermediate braze material. The configuration of the bore assemblies of the subject invention provides a ready means to satisfy this requirement. For example, in the pressed assembly described above, intimate contact is established between the graphite element and the copper sleeve. It has been demonstrated that this approach is sufficient to achieve the intimate contact required with these types of active brazes.

In one test piece, a copper sleeve and a graphite insert having the dimensions listed in Table 1 below, were utilized with a piece of Ticusil foil, formed into a matching conical shape. The foil was placed between the parts prior to the pressing step. During the pressing step, the copper sleeve was stretched over the graphite element and the surrounding Ticusil foil, until the planar surfaces of the copper and graphite elements were flush (as above). The graphite element was supported on a post of smaller diameter in the brazing oven to allow the "drop down" effect discussed above to occur in the following braze step. The assembly was vertically oriented and heating to the braze temperature was carried out in a vacuum oven using a cycle compatible with the Ticusil braze material. The piece was then sectioned and the braze joint was found to be quite strong mechanically.

For these part dimensions and this braze temperature, a radial gap of 2 mils would have developed between the copper and graphite pieces without the "drop-down" effect of the tapered geometry. The relative positions were measured after the braze cycle, and the copper piece was found to have dropped down, until the surface of the graphite piece (which was initially flush), was the 0.044" below the copper rim. If the drop down effect had accommodated all of the 2 mil expansion gap, the dropped length would have been 0.058". That there is a slight difference in drop distance here is reasonable, because the copper piece was initially stretched and distorted in the pressing step, and an initial differential expansion with temperature rise was required to relieve whatever elastic deformation was present, before a gap (and "drop down") could occur. This tapered geometry thus contributed to the success of this braze test. In other geometries where a braze to a graphite insert is desired, a molybdenum sleeve (or copper plated molybdenum sleeve) may be used to provide a good match of thermal expansion coefficients.

A number of laser tubes have been constructed in accordance with the embodiment shown in FIGS. 1–3 and 12. The dimensions of the main bore parts are set forth below in Table 1.

TABLE 1

Main Bore Part Dimensions,
Model K3000 Krypton Laser (Refer to FIG. 1)

| | | | |
|---|---|---|---|
| Cup 26 | thickness | c | 0.045" |
| | O.D. | | 1.125" |
| | dia. of opening 28 | | 0.310" |
| | number of gas return holes | | 18 |
| | dia. of gas return holes (before forming) | | 0.094" |
| | dia. of circle through centers of gas return holes | | 1.060" |
| Shield 27 | I.D. | $D_4$ | 0.625" |
| | height | h | 0.300" |
| Insert 30 | max. dia. | $D_2$ | 0.400" |
| | thickness | t | 0.300" |
| | bore dia. | $D_1$ | 0.141" |
| | half-cone angle | $A_1$ | 2° |
| Sleeve 40 | outside dia. | $D_3$ | 0.500" |
| | thickness | | 0.310" |
| | half-cone angle | $A_2$ | 2° |
| Spacing between inserts | | s | 0.394" |
| Gap between faces of opposed inserts | | g | 0.094" |

At this time 10 tubes using substantially these dimensions have been built with graphite inserts and 8 have been operated. Five tubes have been life tested at their design current of 65A in krypton gas with over 5,000 hours of operation being recorded. One tube has been run for 2,600 hours. These tubes were operated with an external gas return path.

One of these five tubes produced at 65A and 527 V an output power typical of all of them of 7 W "all lines red" (simultaneous 647 nm and 676 nm) operation in the lowest order resonator mode. After running for 520 hours this tube was sectioned. Changes in the diameters $D_1$ of the bore elements were recorded as a function of position along the length of the bore. Of the 120 bore segments making up the length of the tube, the central 92 graphite inserts showed an enlargement of the bore hole by 1 to 2 mils on the cathode end of the insert, and 3 to 4 mils on the anode end. This result for a cold (conduction cooled) graphite bore element of negligible erosion is obtained where the spacing s between elements is 2.8 times the bore diameter $D_1$. This agrees with the result disclosed in U.S. Pat. No. 4,001,720, issued Jan. 4, 1977 to Carbonea where for hot (radiation cooled) graphite bore elements, the sputter erosion was negligible if $s/D_1$ was less than 3.0.

The anode ends of the five bore elements on either side of this central group showed a rounding of the corner edges and a greater enlargement (7 to 9 mils diameter increase). The remaining 9 elements on either end had been built as transition sections, with a deliberate tapered bore profile. That is, the bore diameters $D_1$ of adjacent segments increased stepwise through the group of nine elements to define a stepped, tapered-cone bore profile opening towards the adjacent electrode at the end of the tube (see Table 2). In these regions the discharge changes from an arc-like discharge in the confined central bore to a glow discharge at the electrodes. A tapered bore profile is used through this transition region to give a stable discharge and a more uniform heat loading along the length of the tube as discussed in the prior art (See W. B. Bridges, A. N. Chester, A. S. Halsted, and J. V. Parker, "Ion Laser Plasmas," Proc. IEEE 59 (1971) p. 724 or A. S. Halsted, W. B. Bridges, and G. N. Mercer, "Gaseous Ion Laser Research," Technical Report No. AFAL-TR-68-227, Hughes Research Labs, Malibu, Calif., July 1968, or W. G. Bridges and A. S. Halsted, "Gaseous Ion Laser Research," Technical Report No. AFAL-TR-67-89, Hughes Research Labs, Malibu California, May 1967.)

Figure 13:
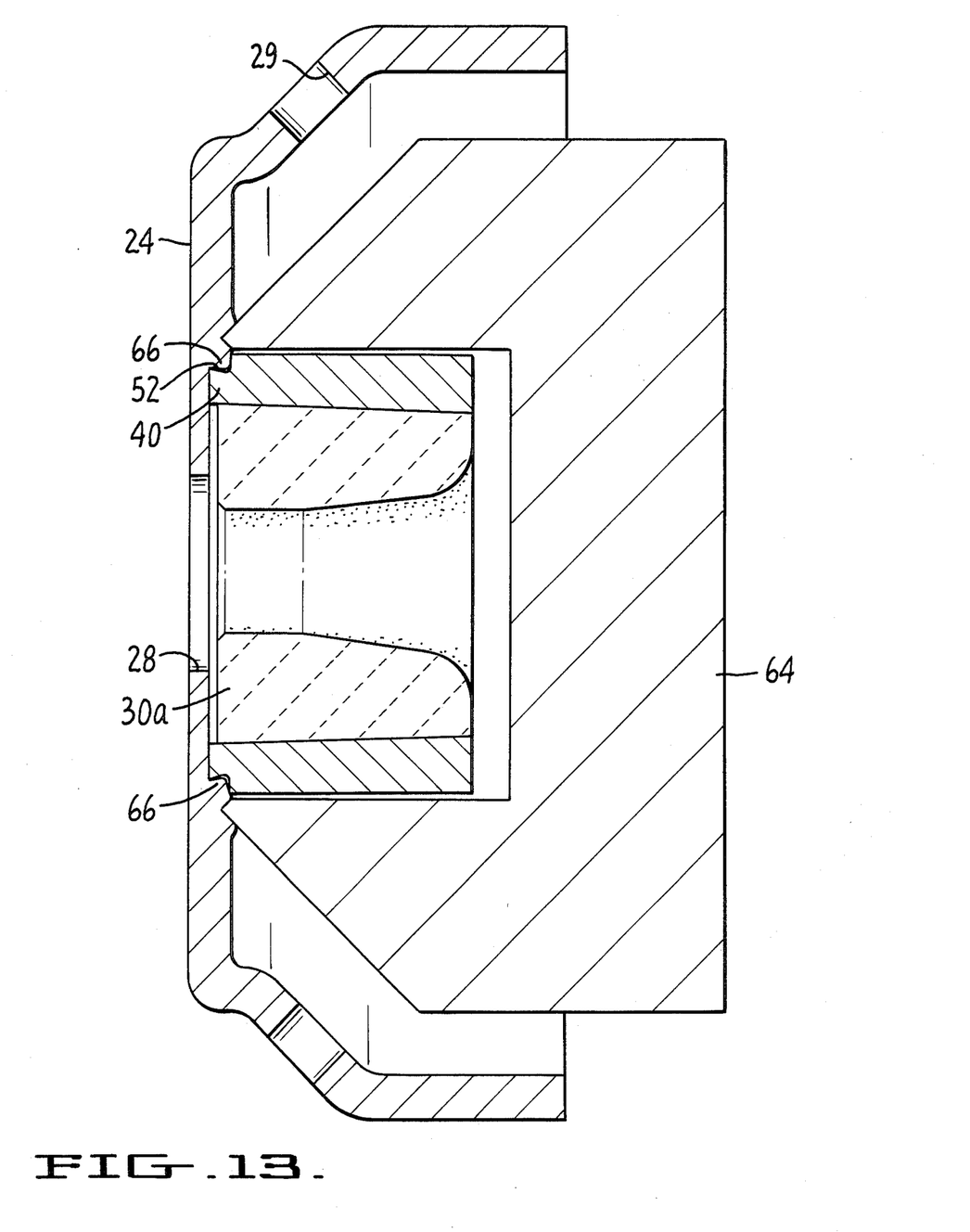
FIG. 13 is a cross sectional view of a bore assembly and associated tooling used for assembly which can be utilized in the transition region of a laser such as shown in FIG. 12.

The extra 7 to 9 mil enlargement of the the five inserts on either side of the central ninety-two inserts, discussed above, is due to the greater sputtering effect which occurs in the transitions, particularly in the cathode transition region. The tube voltage versus current characteristic depends on the average bore diameter and it is desirable to have this characteristic be stable. Also, it is desirable to minimize the amount of sputtered material free to move around in the tube (which can result in shorts). Sputtered material may also deposit on the cathode ends of segments, reducing the bore diameter and aperturing the laser beam. These effects are reduced by pre-shaping inserts in high-sputter regions, to their final, sputtered profile. Thus a "fluted" profile insert, with a 7½° half angle cone opening toward the anode, and rounded corners at the anode end, was used in the final tube design for the five discs adjacent the central bore. A section of a "fluted" insert 30a is shown in FIG. 13. The hole diameters $D_1$ of a full complement of bore inserts for the preferred embodiment of the Model K3000 Krypton laser is given in Table 2.

TABLE 2

Bore Diameters of Inserts 30
In the Model K3000 Krypton Laser

| Quantity | Diameter $D_1$ (inches) | Material | |
|---|---|---|---|
| 1 each | .500 | Tungsten | TRANSITION |
| | .343 | | REGION |
| | .270 | | |
| | .220 | Graphite | |
| | .195 | | |
| | .172 | | |
| | .152 | | |
| | .144 | | |
| | .141* | | (fluted) |
| 4 each | .141 | Graphite | (fluted) |
| 95 each | .141 | | MAIN BORE |
| 4 each | .141 | | (fluted) |
| 1 each | .141* | Graphite | (fluted) |
| | .144 | | TRANSITION |
| | .152 | | REGION |
| | .172 | | |
| | .195 | | |
| | .220 | | |
| | .270 | Tungsten | |

TABLE 2-continued

Bore Diameters of Inserts 30
In the Model K3000 Krypton Laser

| Quantity | Diameter $D_1$ (inches) | Material |
|---|---|---|
| | .343 | |
| | .500 | |

*These two discs establish the bore centerline.

The inserts of the transition regions which have larger bore diameters than the mandrel diameter can not be centered by the mandrel in the assembly operation described above. These bore assemblies could be prebrazed on the centers of their respective cups, with a braze material having a higher braze temperature than that used to attach the heat conducting members to the ceramic tube. These pre-brazed assemblies are then assembled into the ceramic tube in the normal fashion.

In practice it has been found convenient to "stake" the graphite transition-region bore assemblies to center them on their respective heat conductive members. The staking process functions to hold the assemblies in place such that they may be brazed to the heat conducting members at the same time the main bore assemblies are brazed. This approach avoids exposing the graphite inserts to the hydrogen atmosphere used in the prebrazing operation.

The staking process is performed with a cylindrical, chisel-edged tool 64 shown in use in cross-section in FIG. 13. This tool fits over the bore assembly, and is pressed into the copper cup to drive a rim 66 of copper material into the circumferential notch 52 in the sleeve 40. This rim 66 function to retain the bore assembly in position for the subsequent braze step. A braze ring, not shown in FIG. 13, is slipped over the bore assembly after staking.

In addition to the transition region bore assemblies, the two assemblies closest to the main bore carry fluted inserts and are also staked (marked by asterisks in Table 2). The inserts of these two assemblies have the same minimum diameter as the main bore and serve to define a center line for the mandrel down the middle of the ceramic tube.

It should be noted that the largest diameter inserts at the end of the tube are defined by thin tungsten discs that can be prebrazed as a matter of convenience. As can be appreciated, FIG. 12 is merely exemplary of the subject invention and is not intended to be an assembly drawing illustrating the exact arrangement of parts described in Table 2.

As illustrated in FIGS. 1 and 12, a cylindrical ring gas barrier or shield 27 may be provided. Shields of dimensions given in Table 1 were used in the five K3000 life tested tubes on all of the heat conducting members, except for the cup closest to the cathode, as shown in FIG. 12. As discussed previously, however, the long, highly-sputter resistant, cold (conduction-cooled) graphite bore assemblies made possible by the present invention can perform the gas-barrier function such that the cylindrical rings 27 can be omitted if the gap g, between adjacent inserts, is made small enough.

An additional, shorter tube was built and tested, where the shields 27 were omitted. The graphite bore assemblies of this tube were attached to the cups by using the frusto-conical tapered approach shown in FIGS. 1-3. In addition, the graphite inserts had a "top hat" portion or snout extending beyond the sleeve (to the right in FIG. 1) to reduce the gap between adjacent inserts, similar to the snout 76b shown in FIGS. 4 and 5 and discussed below.

The bore diameter $D_1$ of this tube was 0.100", the snout diameter was 0.302", and the thickness t of the insert (including the snout) was 0.335", making the gap g a distance of 0.06" or 0.6 of the bore diameter. Preferably, the gap g between adjacent faces should be less than the bore diameter $D_1$. In addition, the width of the annulus of the exposed face of the bore assembly [width=($\frac{1}{2}$) $(D_7-D_1)$] was comparable to the bore diameter $D_1$. The heat conducting members used (without the shields 27) were of the dimensions given in Table 1.

This tube was operated without an external gas return path in argon gas at 690 Amps/cm$^2$ current density for 500 hours. Its output power performance (4.2 W with "all lines" blue-green mirrors) and other operating characteristics were substantially the same as five other tubes using thin tungsten discs plus shields (which gave outputs from 3.6 W to 4.2 W "all lines" blue-green), but otherwise of identical construction (same cups, alumina tube, bore diameter, transition regions, number of main bore segments, and tube current).

Another method of determining confinement or shielding of the discharge is to examine sputter deposits in a life tested tube. Even though the dimensional changes in the graphite elements of the K3000 tubes discussed above were slight, a thin film or discoloration of interior tube parts in contact with the discharge resulted after extended operation. The sectioned, life tested tubes were examined, and the sputter deposits found to extend only a gap thickness along the inside surface of the shield, from the face of the cup. The remainder of the inside surface of the shield was free of discoloration showing that the sputtering, and therefore the active discharge region, was confined to the gap between segments. Here the gap g was 1.2 mm, or $\frac{1}{2}$ of the bore diameter $D_1$.

The shieldless tube was also examined for sputter deposits. Here there was found a thin film of discoloration over the exposed face of the cup, which grew thinner and disappeared radially as the edge of the cup face was approached.

These observations of the normal performance of the shieldless tube, and the sputter deposit discolorations in all of the tubes, demonstrate that the function of the shield is performed by close-spaced, long, conduction-cooled graphite inserts of the dimensions given. The widths of the annuli of the exposed faces of the bore assemblies in both cases above were at least a bore diameter, and the gaps between faces of adjacent bore assemblies were less than a bore diameter. To be effective as a shield, the probability must be high that the hot gas atoms and ions that escape the main discharge region, will collide with the surface of a bore assembly and be cooled. This probability increases as the width of the bore assembly annulus increases, and especially as the gap between adjacent bore assemblies decreases. The observations above, show that the dimensions above are sufficient to eliminate the need for a separate shield element in an ion laser of this type.

Conduction cooled graphite inserts thus offer a number of advantages in the construction of ion laser bore assemblies. There are also disadvantages, due to the porous nature of this material. For example, graphite is difficult to clean thoroughly, a normal requirement of all parts interior to the gas envelope of the ion laser.

The present invention, however, uses a relatively small volume of graphite, which makes practical the use of pure grades of graphite, that have been vacuum outgassed at high temperature for protracted periods of time. In the tubes discussed above, the graphite used was grade DS-13 of the Pure Carbon Co., Inc., St. Marys, Pa., which is specified to have an ash (impurity) content of less than 10 ppm. It would also be possible to use pyrolytic graphite which can be obtained at even higher purity. The graphite was outgassed in a vacuum oven at 1200° C. for a minimum of 6 hours, or longer where it was required for the pressure in the vacuum chamber to drop to a base pressure of $1 \times 10^{-7}$ Torr The vacuum chamber was backfilled with argon and exposure of the graphite inserts to atmospheric air was then limited, as much as possible, to the time of assembly of the tube.

It has also been found useful as a quality-control measure for graphite used in ion laser bores, to measure the impurity content of a batch of material using an elution test. This test consists of placing a graphite sample of known weight into a temperature programmed furnace having an oxygen atmosphere. The evolved gases resulting from volatilization, pyrolysis, and combustion are passed through a constant temperature catalytic furnace to assure complete conversion to carbon dioxide. The carbon dioxide concentration is plotted versus oven temperature. Pure graphite gives a known concentration rise with temperature, with a steep rise occurring above 600° C. Organic materials contaminating the graphite (which are difficult to detect by other means) evolve at lower temperatures, and give deviations on the plots, or "thermograms," above the pure graphite baseline. The total organic contaminant levels can be determined from the area under these deviations with an accuracy of a few ppm. Measurements of this type were done on graphite samples for us by N M Research, Inc., Richmond Calif.

Another potential problem with graphite is its chemical reactivity with other contaminants inside the tube. For example, it is difficult to remove all water vapor from tube parts. Water (and the oxygen it gives rise to in the discharge) reacts with graphite at termperatures above 700° C. to produce carbon monoxide (see Kohl, cited above, at Chapter 4). This can thermally dissociate on hot parts of the tube to produce a coating of soot, and more free oxygen to repeat the cycle. In this regard, the present invention, which uses conduction cooled graphite, is an advantage over earlier radiation cooled graphite lasers since the graphite in the subject invention is held at temperatures below the reaction temperature.

The porous nature of graphite also causes changes of the gas pressure inside the laser tube when it is cycled off and on, due to gas being absorbed or driven out of the material. Thus, where graphite is used it was found desirable to provide an external ballast tank attached to the tube to increase the total gas volume, relative to the graphite volume, and thus stabilize and reduce these changes in gas pressure. In addition, a sieve pump can be used to periodically reduce pressure in the tube, if, as sometimes happens, gas evolves from the graphite inserts over long periods without tube use (i.e., without running the discharge).

For examples of a suitable ballast tank and seive pump, see U.S. Pat. No. 4,674,092, entitled "Miniature Cryogenic Pump Method and Apparatus for Ion Lasers", issued June 16, 1987, assigned to the same assignee as the subject invention and incorporated herein by reference.

Figure 4:
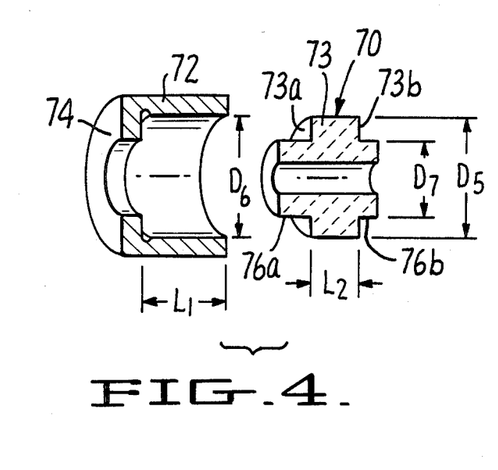
FIG. 4 is an exploded perspective view, with parts cut away, illustrating the elements in the second embodiment of the new and improved bore assembly of the subject invention.
Figure 5:
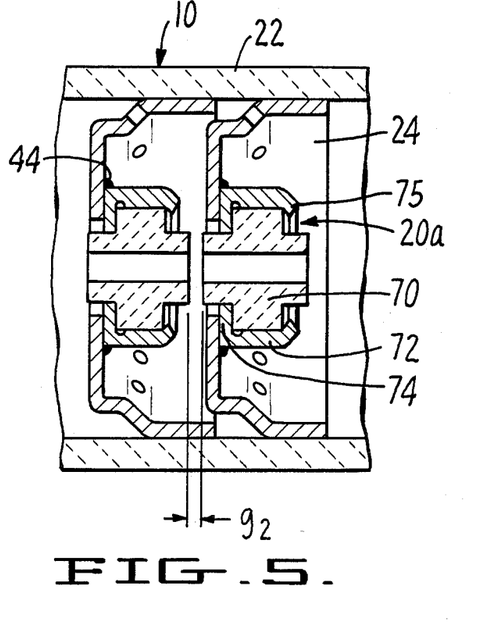
FIG. 5 is a cross sectional view similar to FIG. 1 illustrating the second embodiment of the bore assembly of the subject invention.

Turning now to FIGS. 4 and 5, there is illustrated an alternate embodiment for implementing the subject invention. In each of the alternate embodiments, like numbers will be utilized to refer to like parts. Referring specifically to FIG. 4, there is illustrated a discharge confining element 70 and an outer support member 72. Discharge confining element 70 includes a center region 73 having an outer diameter $D_5$ designed to mate with the inner diameter $D_6$ of sleeve 72. The dimensions of the diameters are arranged such that during assembly of the bore structure 20a, a light press or slip fit is produced.

Sleeve 72 is provided with an annular rim or shelf 74 to contain the insert 70. In this embodiment, the length $L_1$ of sleeve 72 (measured from the shelf 74 to the opposed end) is greater than the length $L_2$ of the center region 73 of the insert 70. This permits the free end of the sleeve 72 to be crimped or swaged, during preassembly to define an anular lip 75. The insert 70 is placed in sleeve 74 until face 73a of central region 73 is butted against shelf 74. The end of sleeve 72 is then crimped radially inwardly into abutting relationship with face 73b of the central region.

These preassembled bore structures 20a are then mounted within the tube as discussed above. The mandrel is then tensioned and the outer support members 72 are brazed to the heat conducting members 24. During operation of the laser, a good thermal pathway is defined when the insert 70 expands radially outwardly into the sleeve 72.

As illustrated in FIGS. 4 and 5, the opposed ends 76a and 76b of the insert 70 are configured with a reduced diameter $D_7$ and project axially beyond the central region 73. The dimensions are designed such that the ends 76 project axially beyond shelf 74 and lip 75 to define snouts extending toward the adjacent bore asembly. This approach allows the gap $g_2$ between adjacent inserts to be readily controlled. As discussed above, by controlling the relevant dimensions of the gap between the inserts, the internal tube parts can be simplified by eliminating the need for a separate shield element. This type of geometry, where the opposed ends 76 of the insert project axially beyond the sleeves to define a snout can be used in any of the embodiments illustrated herein.

This emobidment also illustrates the case where the insert 70 is entirely captured and confined within the sleeve in the preassembly step. Such capture in preassembly could be done by brazing, brazing on a rim, or screwing on a rim, as well as by crimping.

Figure 6:
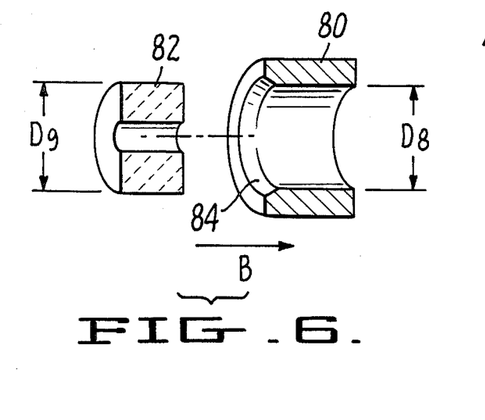
FIG. 6 is an exploded perspective view with parts cut away of the elements of a third embodiment of the bore assembly of the subject invetnion.
Figure 7:
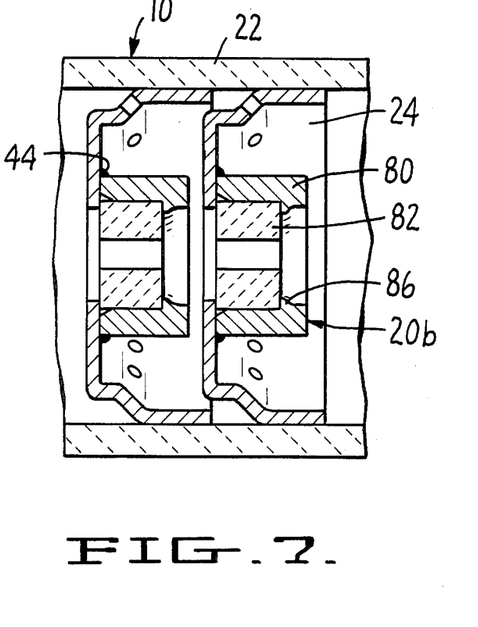
FIG. 7 is a cross sectional view similar to FIG. 1 illustrating the third embodiment of the subject invention.

Turning now to FIGS. 6 and 7, a third embodiment of the subject invention is illustrated. In this embodiment, the bore assembly 20b is fabricated with a broaching technique. As seen in FIG. 6, the inner diameter $D_8$ of the outer support member 80 is arranged to be slightly less than the outer diameter $D_9$ of the discharge confining element 82. Preferably, a tapered region 84 is provided along the inner periphery of the outer support member 80 to facilitate initial alignment of the insert during assembly.

In the assembly step, the insert 82 is forced within the outer support member 80 in the direction of arrow B. This insertion action actually enlarges the inner diameter of the support member as it is inserted, thereby sizing this diameter to precisely fit the outer diameter of the insert 82. In addition, material from the outer support member is forced axially in the direction of insertion and radially inwardly to define an annular ring shown as 86 in FIG. 7. The annular ring will have an inner diameter less than the outer diameter of the insert and thus functions to trap the insert, adding to the mechanical containment. The bore structures 20b may be assembled and brazed as discussed above.

The structure shown in FIGS. 6 and 7 is particularly suitable where the material selected for the discharge confining element 82 is significantly harder than the material selected for the outer support member 80. In this case, the insert will not deform during the broaching process but rather, material from the inner surface of the outer support member will be stripped and reformed to define the annular ring 86, as illustrated in FIG. 7.

One example of a bore material suitable for use with this broaching technique is silicon carbide. Silicon carbide is hard, brittle, and difficult to braze. It also has good sputter resistant characteristics. One tube has been constructed with a silicon carbide bore in accordance with this embodiment.

Figure 8:
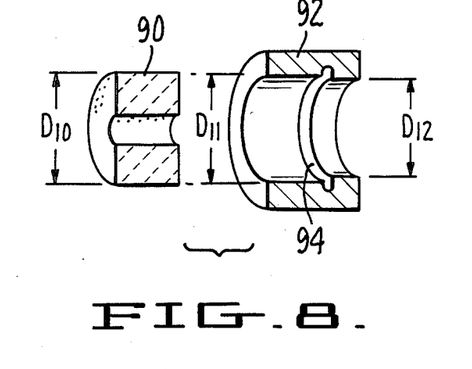
FIG. 8 is an exploded perspective view with parts cut away illustrating the elements of the fourth embodiment of the subject invention.
Figure 9:
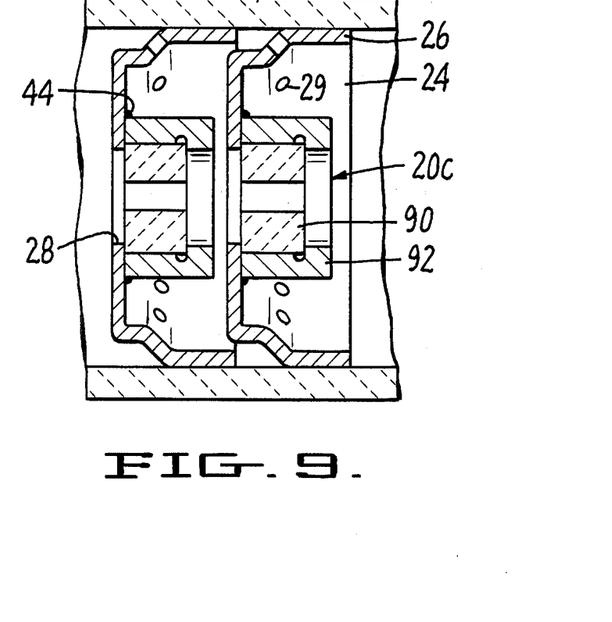
FIG. 9 is a cross sectional view similar to FIG. 1 illustrating the fourth embodiment of the subject invention.

Turning now to FIGS. 8 and 9, there is illustrated the fourth embodiment of the subject invention. In contrast to the third embodiment shown in FIGS. 6 and 7, the fourth embodiment can be utilized where the insert is made from a material which could not withstand assembly by interference fit. In this case, the outer diameter $D_{10}$ of the discharge confining element 90 would be machined to closely match the inner diameter $D_{11}$ of the outer support member 92. Preferably, the outer support member is provided with an annular step 94 for mechanically confining the insert. The diameter $D_{12}$ of the step is less than the diameter $D_{10}$ of the insert 90.

During the assembly, the discharge confining element 90 is fit within the outer support member. The bore structures 20c are mounted on a mandrel which is tensioned during the braze step. The braze step is carried out as described above to complete the mechanical confinement of the insert. During operation of the laser, the discharge confining element will radially expand into thermal contact with the inner surface of the outer support member. By carefully machining the parts to a close fit, adequate heat transfer can be achieved.

Figure 10:
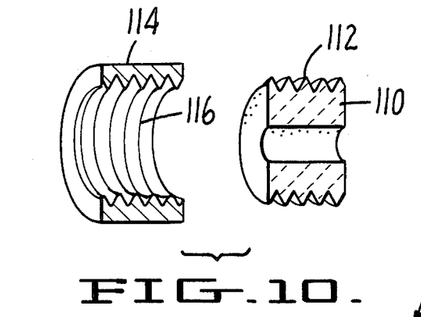
FIG. 10 is an exploded perspective view with parts cut away illustrating the fifth embodiment of the bore assembly of the subject invention.
Figure 11:
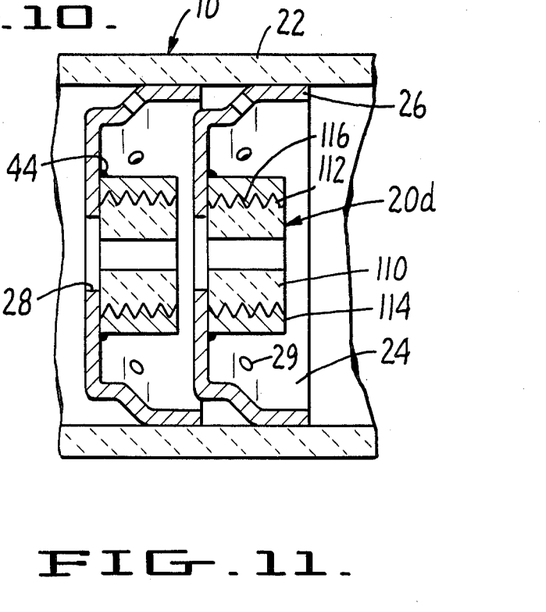
FIG. 11 is a cross sectional view similar to FIG. 1 illustrating the fifth embodiment of the bore assembly of the subject invention.

Referring now to FIGS. 10 and 11, a fifth embodiment of the subject invention is illustrated. In this embodiment, the outer surface of the discharge confining element 110 is provided with threads 112. Similarly, the inner surface of the outer support member 114 is provided with a complementary threaded configuration 116. During the initial assembly step, the discharge confining element is screwed into the outer support member 114 to define the bore structure 20d. This threaded interengagement provides the containment required for the subject invention. The bore assemblies 20d can then be mounted on a mandrel and brazed in a manner similar to the earlier embodiments. The assembled configuration is illustrated in FIG. 11.

As can be appreciated, the new and improved bore assembly of the subject invention permits the material, which forms the discharge confining element, to be selected without regard to the material's brazing characteristics. By this arrangement, the selection of the discharge confining element may be based on other factors, such as sputter resistance, electrical and thermal conductivity.

As discussed above, this flexibility will yield many advantages. Briefly, the use of a more sputter-resistant material will permit operation of the laser at higher power outputs and result in longer life. The subject invention will also permit the utilization of discharge confining elements which are greater in length since sputtering is reduced. When bore segment lengths are increased it is possible to simplify the internal parts of a laser. For example, the dimensions of the bore assembly may be selected to shield the gas return path thereby serving the function of the gas shields in the Hobart patent.

Finally, the subject system will readily permit evaluation of different materials in the bore of a laser system. More specifically, a new material can simply be shaped to fit within the outer support member and assembled as discussed above. By this arrangement, new materials, or insufficiently tested old materials can be rapidly tested without undue experimentation or cost. Potentially suitable bore materials can be chosen on the basis of Wehner's theories (see the article cited above). These theories stress the importance of the momentum transfer in the sputtering impact, the heat of sublimation and the speed of sound in the target material, as factors in determining the sputter erosion rate. Based on these theories, potentially suitable bore materials include hafnium carbide, titanium carbide, silicon carbide and hafnium. This approach will also permit testing of newly available materials such as alumnium nitride.

In summary, there has been provided a new and improved bore assembly for use within the tube of an ion laser. The bore assemblies are mountable to a heat conducting member having a central aperture. Preferably, the periphery of the heat conducting members are brazed to the inner surface of the tube. The bore assembly of the subject invention includes a highly sputter-resistant, discharge confining element having a central bore. An outer support member is provided, disposed about at least a portion of the discharge confining element and brazed to the heat conducting member in a manner to mechanically constrain the discharge confining element. The outer support member is mounted such that the channels of the discharge confining elements are coaxially aligned. During operation, the mechanically constrained discharge confining element will be heated and expand radially into the outer support member until thermal equilibrium is achieved thereby defining a thermally conductive pathway for cooling the laser.

While the subject invention has been defined with reference to preferred embodiments, it will be apparent that other changes and modifications could be made therein, by one skilled in the art, without varying from the scope and spirit of the subject invention as defined by the appended claims.

We claim:

1. A mechanically constrained bore assembly for use within a gas laser tube, said bore assembly being mountable to a heat conducting member, said heat conducting member having a central opening and a periphery, with the periphery of said heat conducting member being attached to the tube of the gas laser at the inner surface thereof, said bore assembly comprising:

a discharge confining element formed from a sputter-resistant material, said discharge confining element having a central channel; and an outer support member disposed about at least a portion of said discharge confining element and connected to the heat conducting member such that said discharge confining element is mechanically constrained whereby during operation of the laser, a thermally conductive path is estblished between the discharge confining element and the outer support member, thereby providing a suputter-resistant inner bore as well as a path for cooling said bore by conduction.

2. A bore assembly as recited in claim 1 wherein said outer support member is connected to said heat conducting member by brazing.

3. A bore assembly as recited in claim 2 wherein said outer support member is formed from a material more suitable for brazing than the material defining said discharge confining element.

4. A bore assembly as recited in claim 1 wherein said discharge confining member is generally cylindrical in configuration with one end thereof being connected to the heat conducting member and with the other end thereof defining a free end.

5. A bore assembly as recited in claim 4 wherein said outer support member is generally cylindrical in configuration and surrounds said discharge confining element.

6. A bore assembly as recited in claim 5 wherein the outer surface of said discharge confining element is provided with a threaded configuration and wherein the inner surface of said outer support member is provided with a complementary threaded configuration engageable with the threads of said discharge confining element.

7. A bore assembly as recited in claim 5 wherein the inner surface of said outer support member includes an annular rim adjacent the free end thereof, said rim having an inner diameter less than the outer diameter of said discharge confining element.

8. A bore assembly as recited in claim 5 wherein the free end of said cylindrical support member is crimped radially inwardly about the periphery of the discharge confining element.

9. A bore assembly as recited in claim 1 wherein the outer surface of said discharge confining element is tapered to a smaller diameter extending away from said heat conducting member and wherein the inner surface of said support member is provided with a complementary tapered configuration.

10. A bore assembly as recited in claim 9 wherein said complimentary tapered surfaces of said discharge confining element and said outer support member are frusto-conical in configuration.

11. A bore assembly as recited in claim 1 wherein the outer diameter of the discharge confining element adjacent the associated heat conducting member is greater than the diameter of the centrl opening of the heat conducting member.

12. A bore assembly as recited in claim 1 wherein said discharge confining element is formed from graphite.

13. A bore assembly for use within a gas laser tube, said bore assembly being mountable to a heat conducting member, said heat conducting member having a central opening and a periphery, with the periphery of said heat conducting member being attached to the tube of the gas laser at the inner surface thereof, said bore assembly comprising:
a discharge confining element formed from graphite and having a central channel; and
an intermediate component connectable to both said heat conducting member and said graphite discharge confining element, said intermediate component functioning to facilitate alignment of the central channel of said graphite discharge confining element and to define a thermally conductive path between the graphite discharge confining element and the heat conducting member, thereby providing a sputter-resistant inner bore as well as a path for cooling said bore by conduction.

14. A bore assembly as recited in claim 13 wherein said intermediate component comprises:
an outer support member disposed about at least a portion of said graphite element.

15. A bore assembly as recited in claim 14 wherein said outer support member is connected to said heat conducting member by brazing.

16. A bore assembly as recited in claim 14 wherein the outer surface of said discharge confining element is tapered to a smaller diameter extending away from said heat conducting member and wherein the inner surface of said support member is provided with a complementary tapered configuration.

17. A bore assembly as recited in claim 16 wherein said complimentary tapered surfaces of said discharge confining element and said outer support member are frusto-conical in configuration.

18. A bore assembly as recited in claim 17 wherein said outer support member is formed from copper.

19. A bore assembly as recited in claim 18 wherein said graphite element is press fit within said copper outer support member.

20. A bore assembly as recited in claim 13 wherein said graphite discharge confining element is brazed to said intermediate component.

21. A bore assembly as recited in claim 20 wherein the intermediate component is connected to said heat conducting member by brazing.

22. A gaseous ion laser comprising:
a gas-confining cylindrical tube made of relatively thin-walled, electrically insulating material;
a plurality of heat conducting members, each having a central opening and a periphery with the periphery of each said heat conducting member being attached to the cylindrical tube at the inner surface thereof;
a plurality of bore assemblies, ech bore assembly including a discharge confining element formed from a sputter-resistant material and having a central channel defined therein, each said bore assembly further including an outer support member disposed about said discharge confining element and connected to individual ones of said heat conducting members such that the discharge confining element is mechanically constrained and a path for conductively cooling said element is defined and with the central channel of each of said discharge confining elements being coaxially aligned;
means for exciting a gas within said tube;
gas return means for equilizing gas pressure within said tube; and
an optical cavity aligned around said tube.

23. A laser as recited in claim 22 wherein each said outer support member is connected to the associated heat conducting member by brazing.

24. A laser as recited in claim 22 wherein each said discharge confining element is brazed with an active metal braze material to each said outer support member.

25. A laser as recited in claim 22 wherein said discharge confining members are generally cylindrical in configuration.

26. A laser as recited in claim 25 wherein said outer support members are generally cylindrical in configuration and surround the associated discharge confining elements.

27. A laser as recited in claim 26 wherein the outer surface of said discharge confining elements are provided with a threaded configuration and wherein the inner surface of the associated outer support members are provided with a complementary threaded configuration engageable with the threads of said discharge confining element.

28. A laser as recited in claim 26 wherein the inner surface of said outer support members include an annular rim adjacent the free end thereof, said rim having an inner dimater less than the outer diameter of the associated discharge confining element.

29. A laser as recited in claim 26 wherein the free end of each cylindrical support member is crimped radially inwardly about the periphery of the associated discharge confining element.

30. A laser as recited in claim 22 wherein the outer surface of each discharge confining element is tapered to a smaller diameter extending away from the associated heat conducting member and wherein the inner surface of the associated outer support member is provided with a complementary tapered configuration.

31. A laser as recited in claim 30 wherein said complimentary tapered surfaces of said discharge confining elements and said outer support members are frusto-conical in configuration.

32. A laser as recited in claim 22 wherein said discharge confining elements are formed from graphite.

33. A laser as recited in claim 22 wherein said gas return means includes a plurality of apertures formed in said heat conducting members located radially outwardly from said bore assemblies.

34. A laser as recited in claim 33 wherein the dimensions of each bore assembly are sufficient to shield the apertures in the heat conducting members from the discharge.

35. A laser as recited in claim 34 wherein the axial gap between opposed ends of adjacent bore defining elements does not exceed the diameter of said central channels of the bore defining elements.

36. A gaseous ion laser comprising:
a gas-confining cylindrical tube made of relatively thin-walled, elctrically insulating material;
a plurality of heat conducting members, each having a central opening and a periphery with the periphery of each said heat conducting member being attached to the cylindrical tube at the inner surface thereof;
a plurality of bore assemblies, each bore assembly including a discharge confining element formed from graphite and having a central channel defined therein, each said bore assembly further including an intermediate component connected to both said graphite discharge confining element and a heat conducting member such that the central channel of each of said graphite discharge confining elements are coaxially aligned and a path for conductively cooling each of said elements is defined;
means for exciting a gas within said tube;
gas return means for equalizing gas pressure within said tube; and
an optical cavity aligned around said tube.

37. A laser as recited in claim 36 wherein said gas return means includes a plurality of apertures formed in said heat conducting members located radially outwardly from said bore assesmblies.

38. A laser as recited in claim 37 wherein the dimensions of the bore assembly are sufficient to shield the apertures in the heat conducting members from the discharge.

39. A laser as recited in claim 38 wherein the axial gap between the ends of the adjacent discharge confining elements does not exceed the diameter of the central channels of said graphite elements.

40. A laser as recited in claim 36 wherein said intermediate component comprises:
an outer support member disposed about at least a portion of said graphite element.

41. A laser as recited in claim 40 wherein each said outer support member is connected to the associated heat conducting member by brazing.

42. A laser as recited in claim 40 wherein the outer surface of each discharge confining element is tapered to a smaller diameter extending away from the associated heat conducting member and wherein the inner surface of the associated support member is provided with a complementary tapered configuration.

43. A laser as recited in claim 42 wherein said complimentary tapered surfaces of said discharge confining elements and said outer support members are frusto-conical in configuration.

44. A laser as recited in claim 43 wherein the outer support members are formed from copper and said graphite elements are press fit within said copper outer support members.

45. A laser as recited in claim 36 wherein said graphite discharge confining elements are brazed to said intermediate components.

46. A laser as recited in claim 45 wherein said intermediate components are connected to said heat conducting members by brazing.

47. A laser comprising:
a gas-confining cylindrical tube made of relatively thin-walled, electrically insulating material;
a plurality of heat conducting members, each having a central opening and a periphery with the periphery of each said heat conducting member being attached to the cylindrical tube at the inner surface thereof;
a plurality of bore assemblies, each bore assembly including a discharge confining element formed from graphite and having a central channel defined therein, each said bore assembly further including an outer support member disposed about at least a portion of said graphite element and brazed to individual ones of said heat conducting members, and wherein the outer surface of each graphite element is frusto-conical and wherein the inner surface of each outer support member is provided with a complementary configuration, and wherein the graphite element is press fit within said outer support member to define a path for conductively cooling said graphite element and with the central channel of each of said graphite element being coaxially aligned;
means for exciting a gas within said tube;
gas return means for equalizing gas pressure within said tube; and
an optical cavity aligned around said tube.

48. A laser as recited in claim 47 wherein said gas return means includes a plurality of apertures formed in said heat conducting members located radially outwardly from said bore assemblies.

49. A laser as recited in claim 48 wherein the dimensions of the bore assembly are sufficient to shield the apertures in the heat conducting members from the discharge.

50. A laser as recited in claim 49 wherein said spacing between adjacent bore assemblies does not exceed the diameter of said central channels of the graphite elements.

51. A laser as recited in claim 50 wherein the axial spacing between like points on adjacent bore assemblies is less than 3.0 times the diameter of the central channel of the graphite element.

52. A laser as recited in claim 47 wherein the graphite elements are brazed within the outer support member.

53. A laser as recited in claim 47 wherein the outer support members are formed from copper.

54. A laser as recited in claim 47 wherein the outer support members are formed from molybdenum.

55. A method for fabricating a laser discharge tube, said tube having a plurality of heat conducting members located within an electrically insulating tube, each heat conducting member having a central opening, comprising the steps of:
assembling a plurality of bore structures, each bore structure being defined by a discharge confining element having a central opening and an outer support member surrounding at least a portion of the discharge confining element;
positioning each bore structure adjacent to individual ones of said heat conducting members in a manner such that the central opening of all the discharge confining elements are coaxially aligned;
connecting each said outer support member to the adjacent heat conducting member such that the discharge confining element is mechanically constrained and defining a thermal path to the heat conducting member for conductively cooling the discharge confining element.

56. A method as recited in claim 55 wherein said step of positioning the bore structures is performed by mounting said bore structures on a mandrel and thereafter tensioning said mandrel.

57. A method as recited in claim 56 wherein said outer support members are connected to the adjacent heat conducting member by brazing while said mandrel is tensioned.

58. The method as recited in claim 57 wherein during said brazing step the laser tube is held in a vertical orientation.

59. A method as recited in claim 55 wherein said discharge confining element is press fit within said outer support member.

60. A method of assembly as recited in claim 55 wherein the outer diameter of said discharge confining element is greater than the inner diameter of said outer support member and said bore structures are assembled by broaching.

61. A method as recited in claim 55 wherein the end of said outer support member opposed to said heat conducting member is crimped radially inwardly.

* * * * *

UNITED STATES PATENT AND TRADEMARK OFFICE
CERTIFICATE OF CORRECTION

PATENT NO.  : 4,734,915

DATED       : March 29, 1988

INVENTOR(S) : Wayne S. Mefferd and Joseph L. Dallarosa

It is certified that error appears in the above-identified patent and that said Letters Patent is hereby corrected as shown below:

In the Specification

Column 5, line 9, "Art" should be --$Ar^+$--.

Column 6, line 32, "invetnion" should be --invention--.

Column 10, line 32, "Vaccum" should be --Vacuum--;
          line 36, "37" should be omitted.

Column 11, line 68, "Carbonea" should be --Carbonetta--.

Column 13, line 33, "function" should be --functions--.

Column 16, line 48, "emobidment" should be --embodiment--.

Column 18, line 27, "alumnium" should be --aluminum--.

In the Claims

Claim 1, column 19, line 4, "suputter" should be --sputter--.

Claim 10, column 19, line 45, "complimentary" should be --complementary--.

Claim 11, column 19, line 51, "centrl" should be --central--.

Claim 17, column 20, line 20, "complimentary" should be --complementary--.

Claim 22, column 20, line 42, "ech" should be --each--;
          column 20, line 55, "equilizing" should be --equalizing--.

UNITED STATES PATENT AND TRADEMARK OFFICE
CERTIFICATE OF CORRECTION

PATENT NO. : 4,734,915

DATED : March 29, 1988

INVENTOR(S) : Wayne S. Mefferd and Joseph L. Dallarosa

It is certified that error appears in the above-identified patent and that said Letters Patent is hereby corrected as shown below:

<u>In the Claims</u>

Claim 28, column 21, line 13, "dimater" should be --diameter--.

Claim 31, column 21, line 25, "complimentary" should be --complementary--.

Claim 43, column 22, line 23, "complimentary" should be --complementary--.

Signed and Sealed this

Eighteenth Day of October, 1988

*Attest:*

DONALD J. QUIGG

*Attesting Officer*  *Commissioner of Patents and Trademarks*